United States Patent
Stuempfle et al.

(10) Patent No.: US 6,505,100 B1
(45) Date of Patent: Jan. 7, 2003

(54) DISTRIBUTED VEHICLE INFORMATION PROCESSING AND VEHICLE CONTROL SYSTEM

(75) Inventors: Matthias Stuempfle, Ludwigsburg (DE); Akthar Jameel, Palo Alto, CA (US); Axel Fuchs, Darmstadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/517,530

(22) Filed: Mar. 2, 2000

(30) Foreign Application Priority Data

Mar. 2, 1999 (DE) .......................................... 199 09 157

(51) Int. Cl.[7] .............................................. G06F 7/00
(52) U.S. Cl. ................................ 701/1; 701/36; 701/24
(58) Field of Search .............................. 701/1, 36, 200, 701/24; 73/178 R

(56) References Cited

U.S. PATENT DOCUMENTS

| | | | |
|---|---|---|---|
| 5,365,451 A | * 11/1994 | Wang et al. ................. 701/213 |
| 5,430,656 A | * 7/1995 | Dekel et al. ................. 701/213 |
| 5,479,157 A | * 12/1995 | Suman et al. ........... 340/825.31 |
| 5,625,556 A | * 4/1997 | Janky et al. .................... 701/1 |
| 5,648,769 A | * 7/1997 | Sato et al. .................... 340/988 |
| 5,848,368 A | * 12/1998 | Allen et al. .................... 701/50 |
| 6,064,319 A | * 5/2000 | Matta ......................... 340/917 |
| 6,084,510 A | * 7/2000 | Lemelson et al. ........... 340/539 |
| 6,097,316 A | * 8/2000 | Liaw et al. .................. 340/988 |
| 6,108,591 A | * 8/2000 | Segal et al. ..................... 701/1 |
| 6,141,611 A | * 10/2000 | Mackey et al. ................ 701/35 |
| 6,154,689 A | * 11/2000 | Pereira et al. .................. 701/1 |
| 6,175,789 B1 | * 1/2001 | Beckert et al. ................ 701/33 |
| 6,202,008 B1 | * 3/2001 | Beckert et al. ................ 701/33 |
| 6,208,918 B1 | * 3/2001 | Ando et al. .................... 701/35 |
| 6,230,097 B1 | * 5/2001 | Dance et al. ..................... 1/23 |
| 6,236,911 B1 | * 5/2001 | Kruger .......................... 701/1 |

FOREIGN PATENT DOCUMENTS

| | | |
|---|---|---|
| DE | 41 40 803 A1 | 12/1991 |
| DE | 43 15 494 C1 | 5/1993 |
| DE | 196 20 885 A1 | 5/1996 |
| DE | 196 25 002 A1 | 6/1996 |
| DE | 196 40 735 A1 | 10/1996 |
| DE | 198 21 500 A1 | 5/1998 |
| DE | 19821500 | 1/1999 |
| EP | 0890937 A2 | 1/1999 |
| JP | 11-027749 | 1/1999 |

OTHER PUBLICATIONS

Opne System Interconnection (OSI)—3 pages.*

Seokhoon Lee et al., "Toward the Next Generation Public Traffic Information System Using Internet", 1997 IEEE, pp. 505–510.

Stefan G. Hild et al., "Mobilizing Applications", IEEE Personal Communications, Oct. 1997, pp. 26–34.

"Are Components the Future of Software?", Don Kiely, Industry Trands, pp. 10–11, Feb. 1998.

* cited by examiner

Primary Examiner—William A. Cuchlinski, Jr.
Assistant Examiner—Olga Hernandez
(74) Attorney, Agent, or Firm—Crowell & Moring LLP

(57) ABSTRACT

A distributed vehicle information processing and vehicle control system has at least one first system part on board the vehicle side and at least a second system part, each for carrying out one or more vehicle-related application functions, with the system parts communicating with one another via an associated data transmission network. The systems parts have a component-based construction composed of different components, which communicate with one another in order to carry out different functions. Each component has a function-calling interface, via which the function carried out by the component can be called up by other components, in this system part or in another system part, and a configuration interface via which its configuration can be defined and varied. A configuration manager unit, provided for this purpose, configures the components via this interface depending on what other components are present in the system.

4 Claims, 7 Drawing Sheets

DISTRIBUTED VEHICLE INFORMATION PROCESSING AND VEHICLE CONTROL SYSTEM

BACKGROUND AND SUMMARY OF THE INVENTION

This application claims the priority of German patent document 199 09 157.9, filed Mar. 2, 1999, the disclosure of which is expressly incorporated by reference herein.

The invention relates to a distributed vehicle information processing and vehicle control system, having at least two system parts as network nodes which communicate via a data transmission network, and at least one of which is arranged on the vehicle side.

Overall, such systems are used for carrying out vehicle-related applications of widely varying types, for example in conjunction with user interfaces, internal and external communication, application support and with the actual applications and services themselves. The latter includes, for example, actuation of vehicle units, evaluation of vehicle sensor information and general services such as navigation, diagnosis, anti-theft devices and data interchange with remote network nodes, for example via the Internet.

Modern vehicle systems are distinguished by a data processing element that is becoming ever larger; that is to say telematics applications are becoming increasingly important. For example, breakdown services and dynamic navigation services as well as Internet-based applications demand the implementation of distributed systems, in which the vehicle is no longer regarded as an isolated individual system, but as an active node in a distributed data communications system, preferably with a worldwide range. System applications implemented aboard the vehicle will in this case in general carry out not only client functions but also server functions.

The layering of functionalities that are required for a vehicle system has already been proposed for a vehicle communications system disclosed in German Patent Document DE 196 25 002 A1, which uses adaptive application control, and allows a certain amount of variability in the assignment of the applications to various interfaces and appliance units on the vehicle side.

In the field of general data processing, a component-based system design has recently been proposed as an alternative to central system architectures. See, for example, the Journal article D. Kiely, "Are Components—The Future of Software?", IEEE Computer Magazine, page 10, February 1998. In this case, the function to be provided by the overall system is broken down into individual functional units ("components"), which then provide the overall desired function by suitable linking and communication with one another. Such breakdown into components on the one hand simplifies their reuse and the design of complex systems from these components, and on the other hand simplifies the production of robust components themselves (since they need be equipped with only a limited, clear functional scope). The components are characterized by their external identical architecture, which makes it possible to link them to one another in a simple manner, such that the function provided by a particular component may initially be viewed independently of this architecture.

The explosive growth in the Internet and the Worldwide Web has led to distributed systems becoming increasingly important. To simplify the implementation of such systems, and to allow component-based systems to be provided, an increasing number of distributed object models have been established. The system developers are also making ever greater use of Internet-oriented solutions for these object models and are implementing them, for example, using Java RMI or "Java Beans". See the corresponding Internet information from Sun Microsystems with DCOM from Microsoft; see also, the publications T. Albertson, "Best Practices in Distributed Object Application Development: RMI, CORBA and DCOM, February 1998, Internet page "http://developer.com/news/techfocus/022398_distl.htm" and P. E. Chung et al., "DCOM and CORBA Side by Side, Step by Step, and Layer by Layer, September 1997, Internet page "http://www.cs.wustl.edu/≈schmitt/submit/Paper.html", or, on the basis of CORBA, see also A. Vogel, K. Duddy, "Java Programming with CORBA", John Wiley & Sons, 1997.

As is evident from the cited literature, the trend towards object-oriented component models can be explained by the following advantages: first, by the capability for reuse of existing algorithms and software, and for "rapid prototyping" of applications by "plug-and-play" interaction of the components; second, mutually independent development and implementation of components; third efficient code maintenance including the systematic distribution of updates; and fourth "lightweight" and "thin clients" implementations, which communicate with infrastructure-based systems, which can be localized there at various points.

One of the characteristic features of such components is that they follow a standard architecture specification, which makes it easier to join them together to form an overall system. In this case, this architecture in principle has nothing to do with the actual function of the component. In fact, it defines how the components interact with one another, but not how they "converse". This characterization is independent of whether the specific component is in the form of software or hardware.

The trend towards component models is evident in the increasing importance of technologies which support distributed component systems, such as "Java Remote Method Invocation (RMI)" as the basis for the JavaBeans components "Common Object Request Broker Architecture (CORBA)" and "Distributed Component Object Model (DCOM)" from Microsoft for implementation of ActiveX. All these models use the client/server approach.

In the past, when vehicles have been delivered to the customer at the end of production, their functionality in terms of services that can be carried out has been relatively greatly fixed. In the future, however, more and more services will be used in vehicles, in the same way that they are also being used in the office and business worlds, even though they still scarcely exist at all at the moment when the vehicle is manufactured. In future, the customer will therefore wish to be able to reequip the vehicle with corresponding new services, for the life of the vehicle. If the reequipment is done by additionally downloading software into the vehicle, then the memory space required for this purpose in the vehicle will at some time no longer be adequate. On the other hand, reequipment additional hardware is comparatively costly and susceptible to faults, and in most cases involves the vehicle being left in a workshop.

There is therefore a requirement for systems which can relatively easily be reequipped with additional functions which are provided, for example, as software modules, so that no hardware modification is required. Furthermore, it is desirable to be able to match the system optimally to changing requirements and conditions by dynamic movement, preferably of software modules, to or from the system part on the vehicle side, for the life of the vehicle. This applies, for example, to changing conditions for wireless communication. If only narrowband communication is available, as little communication as possible should be carried out and as much of the necessary software as possible should be accommodated in the vehicle. On the other hand, if a communications link with a high transmission capacity is available, certain operating software can more advantageously be accommodated in a system part outside the vehicle, in order to allow the generally greater computation capacities there to be utilized.

One object of the present invention is to provide a vehicle information processing and vehicle control system of the type mentioned initially, whose structure for carrying out various vehicle-related applications is designed comparatively flexibly, so that reequipping with further functions is possible at relatively low cost. Also, the precondition is provided to allow the required applications to be carried out such that they are distributed variably, dynamically and flexibly between the system parts, and such that the vehicle can be integrated as an active network node in a data network which may be worldwide.

These and other objects and advantages are achieved by the distributed vehicle information processing and vehicle control system according to the invention, whose system parts have a component-based construction, being composed of different components which communicate with one another in order to carry out the various desired application functions. Each of these components, which are defined in this way and are preferably in the form of software on the one hand, has a function-calling interface via which the function carried out by the component can be called up by all the active nodes in the network, and a configuration interface, via which its configuration can be defined. Thus, it can be varied, by means of a configuration manager unit provided for this purpose.

To this end, the configuration manager unit receives knowledge about the components that are present in the system, and configures the respective component, via its configuration interface, depending on what other components are present. In consequence, this configuration manager unit allows a component which has been newly fitted in a system part (irrespective of whether this is by reequipment of the system with the same system part or by movement from another system part) to be "configured" such that it can communicate optimally with the other components that are present.

Matching of the new components to the relevant system part may possibly also involve a modification of the configuration of one or more of those components which were already present. This design allows the vehicle-related system to be equipped with a general data processing platform, which allows flexible reloading of further executable vehicle-related applications at any time during the life of the vehicle, while allowing optimized-cost reaction by service implementations to variable external conditions.

In one embodiment of the invention, a component loader is provided for the respective system part (also referred to as a "bathtub" in general computer processing), which accommodates the respective components. The latter communicate via the component loader with an operating system in the system part to which, on the other hand, various external appliance units are coupled, depending on the system part.

In another embodiment of the invention, a function-based hierarchy of the components is provided in vehicle-component-related components or "interface" components, which are closely based on the existing hardware, vehicle appliance units and, for example, provide access to hardware interfaces for communications appliances or the display and control appliances of a user interface. Aggregation components offer services which aggregate raw information from the vehicle-component-related components, and in higher-level application components represent the actual services and have access not only to the aggregation components but also to an intermediate layer and to the vehicle-component-related components and user-interface components.

According to another feature of the invention, means are provided for dynamically moving one or more of the components between the involved system parts during the system life, and thus, in particular, at any desired times throughout the entire life of the vehicle. These means for moving components make use of the fact that the components are provided with a configuration interface and are "configurable" via this interface. Thus, they can be varied to match a new component environment of a different system part. In consequence, a respective component can, for example, be placed in one system part for certain times and in another system part for other times, depending on the changing external conditions, such as the available transmission capacity of the network communication path. Those components which are not closely related to vehicle-side hardware appliance units are particularly suitable for such movement.

Finally, according to another feature of the invention, communication between application-related components is direct, and thus the components must know the interfaces of those components which they use. Alternatively, communication takes place via a respective, jointly used data-maintenance component, to which the application components involved write new information; and information that has newly been written there can be read by other involved components. In this case, the application components do not need to know the interfaces of the other components, but it is necessary to agree what contents are written to the data-maintenance component.

Other objects, advantages and novel features of the present invention will become apparent from the following detailed description of the invention when considered in conjunction with the accompanying drawings.

DETAILED DESCRIPTION OF THE DRAWINGS

Figure 1:
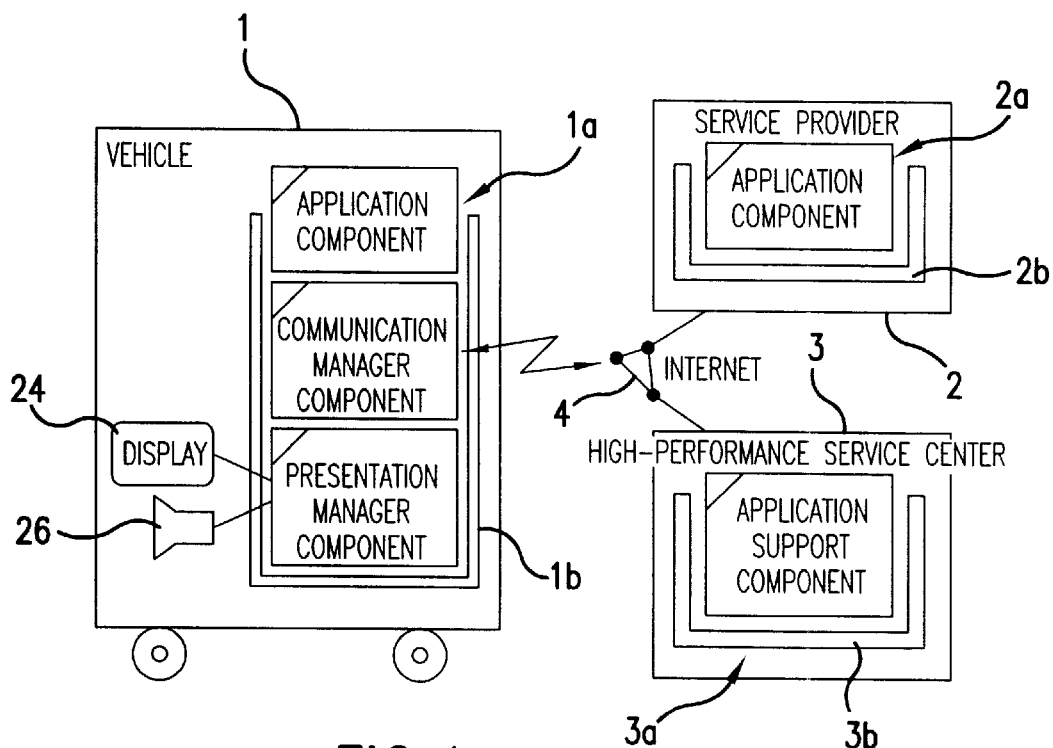
FIG. 1 shows a schematic illustration of a distributed vehicle information processing and vehicle control system having system parts on board and external to the vehicle, which are networked with one another.

FIG. 1 shows, schematically, a distributed vehicle information processing and vehicle control system which comprises a plurality of physically separated system parts 1a, 2a, 3a, which form active network nodes in a data transmission network 4, such as the Internet, and communicate with one another via this network. A first system part 1a is located in the vehicle 1 itself, which represents a "mobile host" in the network 4. A second, stationary system part 2a is located in a service provider 2, while a third system part 3a is located in a high-performance service center 3. Other vehicles may form active network nodes in the same way, which can access services from the service provider 2 and from the high-performance service center 3. (Although not shown, there may in each case also be a plurality of the two last-mentioned service providers in the data network 4.)

The service providers 2, 3, which are external to the vehicle, are normally used primarily to carry out such services for the vehicle 1 as require a relatively high computation capacity that is not per se available in the vehicle 1. This may include, for example, complex navigation services such as route finding based on the traffic situation. Similar to the stationary service providers 2, 3, the vehicle 1 has a network identity, by means of which it is known in the network 4. The function blocks of the three illustrated network nodes 1, 2, 3 schematically indicate that the system part 1a, 2a, 3a respectively implemented there has a component-based design, which will be described in more detail below.

For the present application of vehicle systems, it appears, from the three conventional technologies mentioned above which support distributed component systems, namely RMI, CORBA and DCOM, that the Java-RMI technology is particularly suitable for this purpose, since this is not dependent on the platform and can be handled with relatively little complexity.

The components which are used to form the system parts 1, 2, 3, and thus the system overall, each include two interfaces: a function-calling (or remote) interface, via which the actual function of the relevant component (that is to say its service) can be called by another component in the same system part or elsewhere by a remote network node, and a configuration interface, which is used for variable configuration of the component, to match the situation. The configuration interface allows the component to be "configured" variably in different system environments, and existing components can be made aware of the newly positioned component via this interface.

This allows a component to be easily fitted and moved (even after the system generation) for the system life, and even if the system boundary conditions change. In this case, the newly fitted system components, and system components (which may already be present in some circumstances) would have to be matched to one another. This may mean, for example, that the addresses of the components would have to be made known to one another, for which purpose the components offer their own "home page" via which the necessary modifications can be carried out. A specific configuration manager unit is provided in this case in order to carry out this configuration task. This unit knows which components are currently in the system and, via the configuration interface, has access to the individual components, in order to modify their configuration.

The system part 2a of the service provider 2 primarily contains application components for carrying out services with a vehicle-related functionality, while the system part 3a of the high-performance service center 3 primarily contains application support components, which require high-performance computation capacities. Apart from application components which represent the actual service applications, the on board vehicle system part 1a primarily also has components "close to the equipment", which are used to control hardware appliance units installed in the vehicle 1, such as a presentation manager component 19, which accesses a visual display 24 and a loudspeaker 26.

In addition, communication manager components are used to handle data communication procedures between the system parts 1a, 2a, 3a via the network 4. The entity formed by the components of the respective system part 1a 2a, 3a has an associated component loader ("bathtub") or component server 1b, 2b, 3b. One suitable example of such a component loader is the ChaiServer from Hewlett-Packard, which is implemented in the Java programming language and supports the loading of the components as well as the routing of method calls to the appropriate components; for further details, see the Company information document Hewlett-Packard "HP ChaiServer: An Overview" on the Internet page "http://www.chai.hp.com/emso/pdf/chaiserverwp.pdf" and "HP Application Server" on the Internet page "http://www.hpconnect.com/embedded/vm/sweb.htm".

Figure 2:
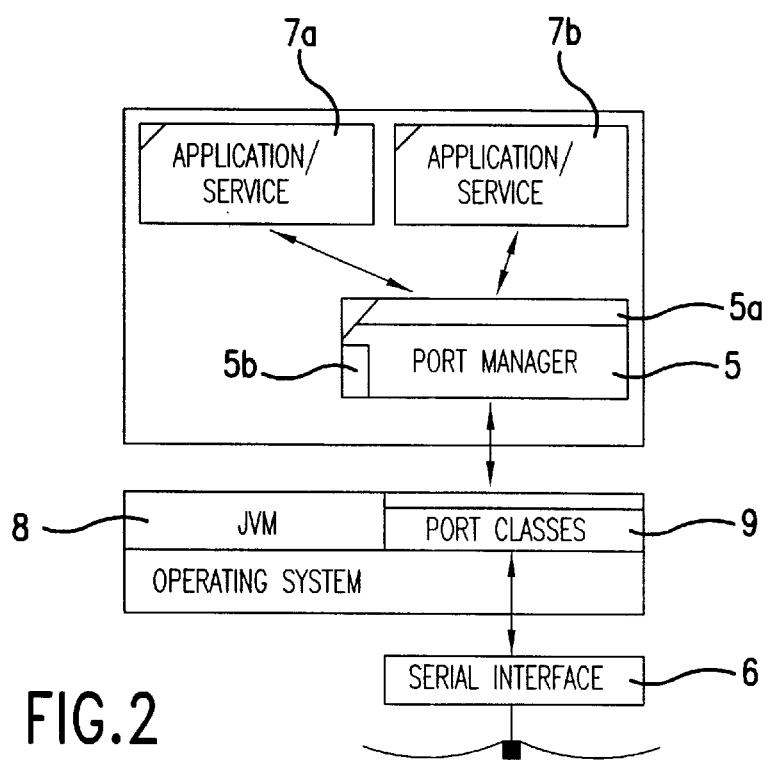
FIG. 2 shows a schematic block diagram of the environment of a port manager component in the system part on the vehicle side in FIG. 1.
Figure 3:
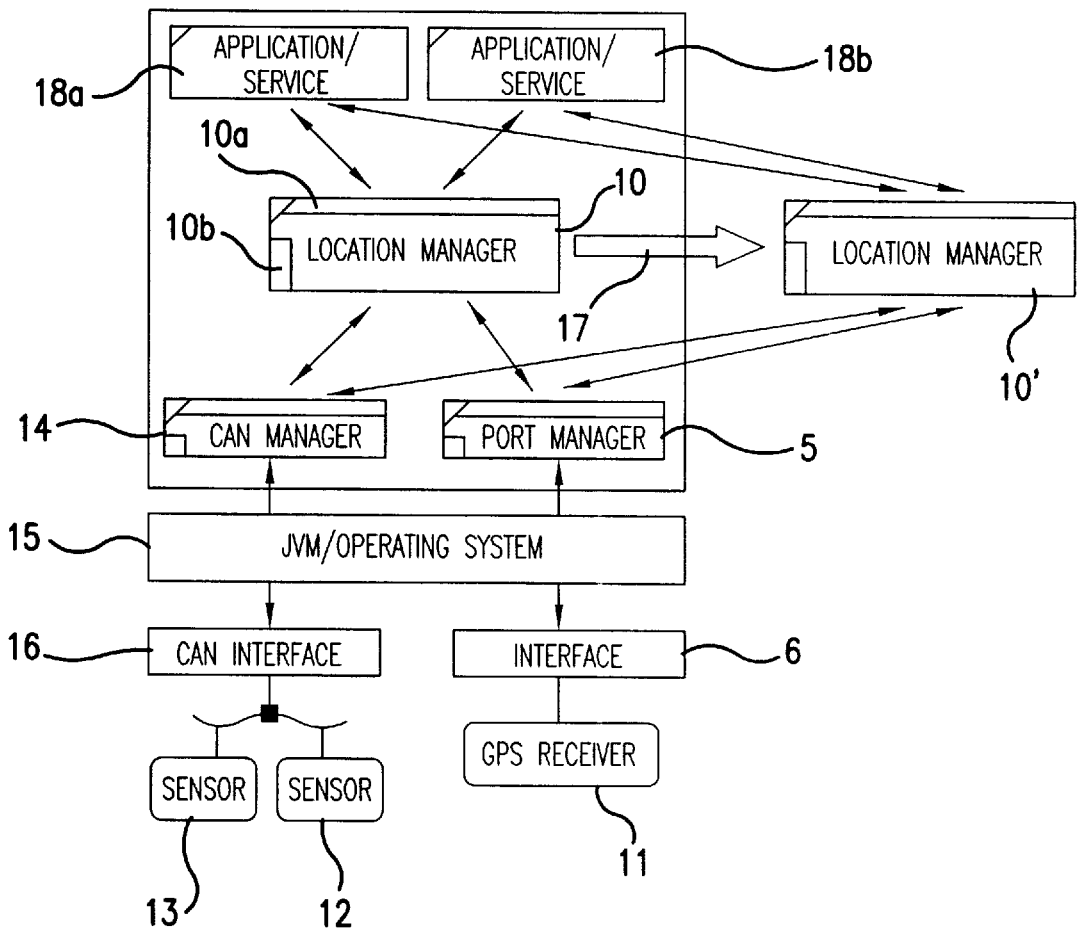
FIG. 3 shows a schematic block diagram of the environment of a location manager component in the system shown in FIG. 1.
Figure 4:
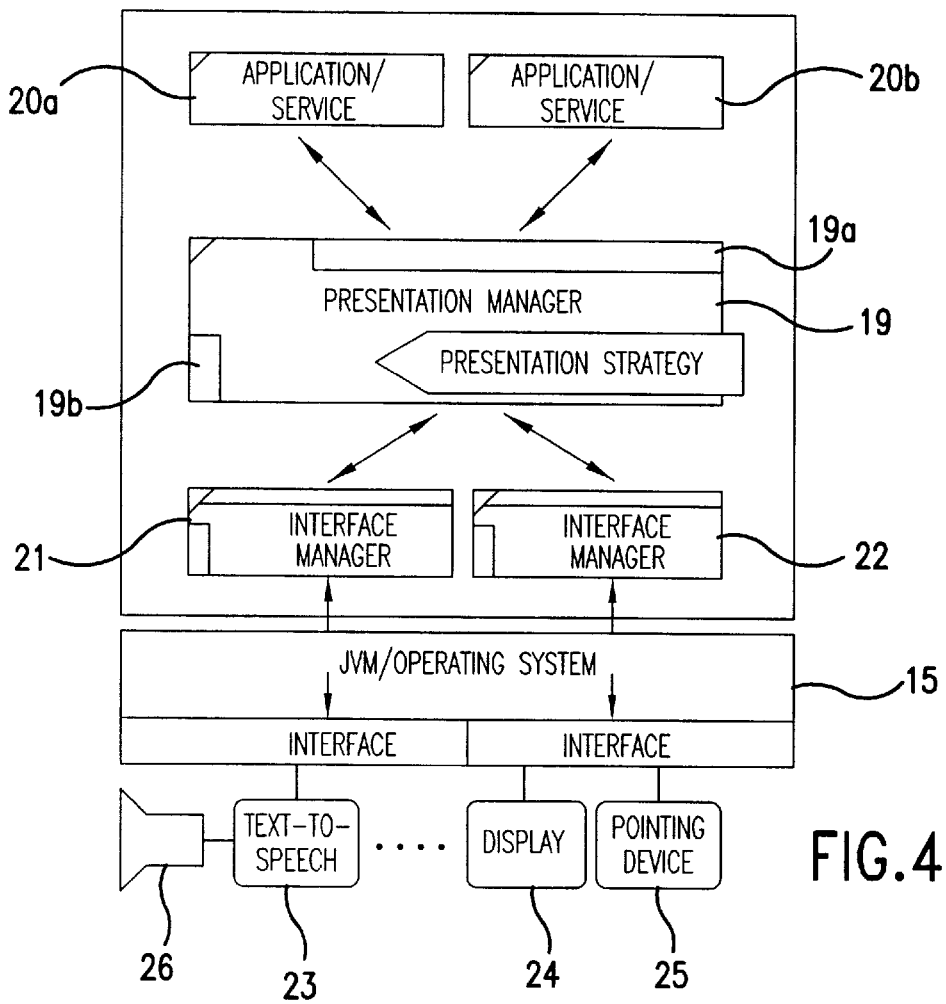
FIG. 4 shows a schematic block diagram of the environment of a presentation manger component in the system shown in FIG. 1.

FIGS. 2 to 4 show three examples of components of the vehicle information processing and vehicle control system. FIG. 2 shows a port manager component 5 in its system environment, for example within the system part located in the vehicle 1. The port manager component 5 is part of a group of interface components which support hardware and carry out functions which are closely linked to hardware appliance units on the vehicle side, for example driver functions. The port manager component 5 allows access to a serial interface 6 of the machine (in this case the vehicle 1, on which it runs). In this case, the access methods are provided such that any authorized remote component can access it. The port manager component 5 to this end knows the system interfaces and, inter alia, controls the assignment of the interfaces and of the connected appliances. It is also responsible for controlling concurrent calls by other components to the ports.

Via its remote interface 5a, the port manager component 5 allows access to the system interfaces from any given point in the network, for example from two explicitly shown applications 7a, 7b. The configuration interface 5a of the port manager component 5 is also shown schematically. The port manager component 5 has no information about the semantic content of the information which is called or written via it. In the chosen Java implementation, it is thus possible for the Java Virtual Machine (JVM) 8 to use additionally formed classes 9, that is to say "port classes" to allow physical access to the serial interface 6.

The function of the location manager component or position manager component 10, which is shown embedded in the architectural system environment in FIG. 3, is to collect position information and then to offer this information in aggregated form as a position information service. Possible information sources are, for example, a GPS receiver 11 and integrated navigation sensors 12, 13, such as a compass and wheel revolution counter. The location manager component 10 to this end accesses appropriate interface components, such as the port manager 5 mentioned above and a CAN manager component 14 which, for its part, accesses a CAN interface 16 via the JVM/operating system layer 15.

A movement arrow 17 shows a movement option, in which the location manager component 10 need not necessarily run on the same machine (for example the vehicle 1) as the interface components 5, 14 which it accesses; rather, it may form an external, remote component 10', which is located in another system part. Whether such movement is expedient depends on the respective boundary conditions at that time, in particular the complexity and the costs for data communication between the system parts. Apart from this, the position manager component 10, like all the components in the system according to the invention, also in turn has a remote interface 10a for communication with other services 18a, 18b, and a configuration interface 10b.

FIG. 4 shows, once again embedded in its system environment, a presentation manager component 19 with a remote interface 19a for function calling from other applications 20a, 20b and a configuration interface 19b. The presentation manager component 19 is responsible for passing on information relating to the applications 20a, 20b, and passes the information on to the user depending on interchangeable strategies. These strategies may, for example, include information being provided only via a voice output while driving and a visual display being activated only when stationary. Such strategies allow necessary safety precautions to be incorporated in the system so that the vehicle occupant or occupants is or are not distracted from their actual task.

Apart from appropriate interfaces, via respective interface manager components 21, 22 the presentation manager has access to user interface components in the vehicle, such as "text-to-speech" and "speech-to-text" appliances 23, visual displays 24 and "touchscreen" and "pointing" appliances to carry out its task. The presentation manager component 19 interacts closely with the system configuration management, since it requires information on the input and output appliances that are present in the vehicle. Furthermore, it is able to suitably resolve concurrent output requests from different applications, comparable to a "Window Manger".

As stated, the architecture of the distributed vehicle information processing and vehicle control system is formed completely from components. (In order to assist in identification, these components are each marked in the figures by a small triangle in the top left-hand corner of their function block.)

Figure 5:
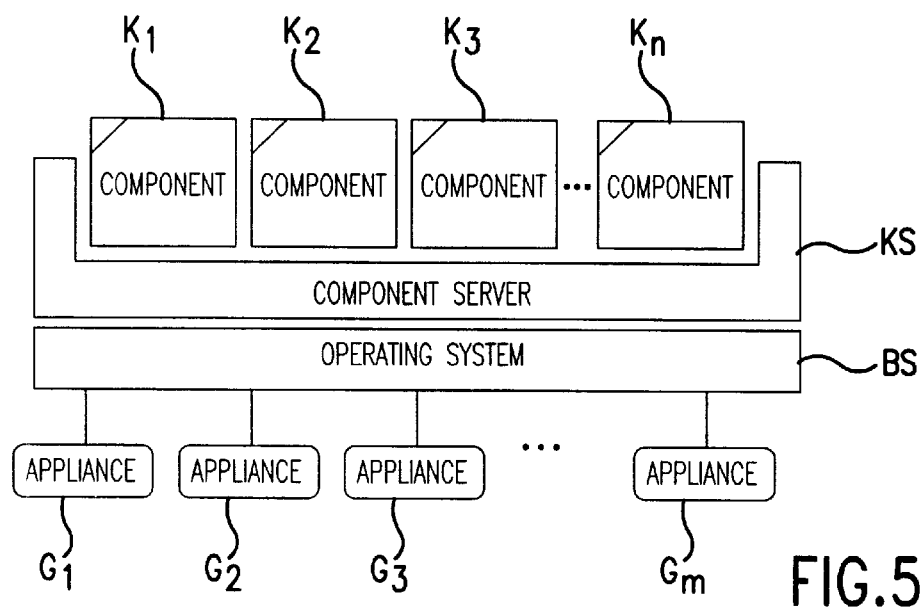
FIG. 5 shows a schematic block diagram of the basic, component-based architecture of the system shown in FIG. 1.

FIG. 5 shows the basic architecture of the system, comprising a number n of components $K_1, \ldots K_n$, to which a component server KS is assigned and which accesses a number m of external appliances $G, \ldots G_m$ via the respective operating system BS. In consequence, from this software point of view, the system comprises a number of components $K_1, \ldots K_n$, which communicate with one another, although there are no hierarchies between the individual components $K_1, \ldots K_n$ at this level.

The communication between the system objects is based on conventional procedures, such as "remote procedure call" (RPC) and its Java version, the "remote method invocation" (RMI). Methods relating to a component which are intended to be called by another component are described in an interface file, comparable with the "interface description language" (IDL) in CORBA. The required "stubs" are then generated from this file, and are linked to a component. The "uniform resource locator" (URL) is used for addressing the method, which is used to address that machine on which the addressed component is running and on which, furthermore, the component itself and the desired method, with an argument, can be specified. URL addressing results in position transparency, that is to say positioning independent of the components, since the machine address is resolved independently of the client entity, for example via a "domain name service" (DNS).

Figure 6:
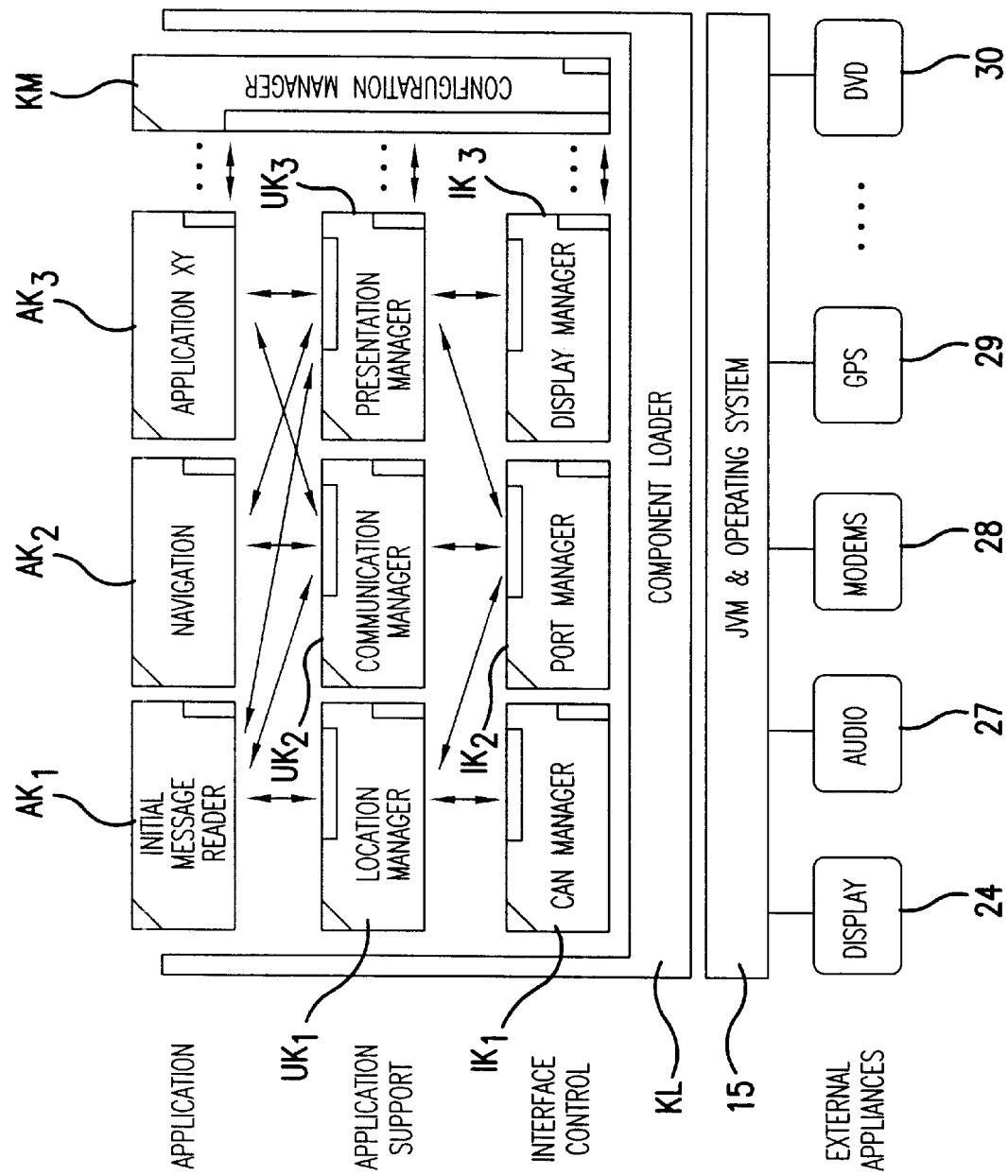
FIG. 6 shows a schematic block diagram of the function-based, hierarchical breakdown of the components in the system shown in FIG. 1.

FIG. 6 shows a function-based arrangement of the system components. This illustration shows a three-level component hierarchy, in which a top layer comprises actual applications, a center layer comprises application-support functions, and a lower layer comprises interface control functions. The components in the top layer form the actual applications or services, that is to say application components $AK_1, AK_2, AK_3, \ldots$ An initial message reader and a navigation component are shown by way of example. To carry out their tasks, the application components $AK_1, AK_2, \ldots$ access the center layer of application-supporting components $UK_1, UK_2, UK_3, \ldots$, which may also be referred to as aggregation components, since they appropriately aggregate raw data, which may come from various sources in the vehicle and from the network infrastructure external to the vehicle. Examples of such application-support components are the location manager and presentation manager components explained above, as well as the communication manager component. These application-supporting components $UK_1, UK_2, UK_3, \ldots$ for their part access the interface components $IK_1, IK_2, IK_3, \ldots$ in the lower layer, which represent components that are closely linked to hardware appliance units on the vehicle side, such as the (serial) port manager explained above, a CAN manager component, and a display manager component.

The component loader KL is assigned to all the components, and communication with external appliances, such as a visual display 24, an audio interface 27, modems 28, a GPS receiver 29 and a DVD 30 takes place via the JVM/operating system layer 15. In this way, the system supports external appliances which can be assigned to the user interface, as well as appliances which the user fits to the system for the first time. If there are no interface components for retrofitted external appliances, they can be loaded retrospectively. The said components, which are broken down on a functional basis into three layers, are jointly assigned a configuration manager component KM using which the components can be moved dynamically between the various system parts of the system.

A further application is subsequent loading of components, in particular in the top layer (that is, application components). The subsequent loading of such application components may be carried out using the present platform, and thus overcomes the difficulty that there is often insufficient knowledge at the time when the vehicle systems are configured as to what services will be of interest to the customer over the entire life of the vehicle. In particular, this also relates to services which load software required for their use into the vehicle, from a system part external to the vehicle, before the service is carried out. The central element for subsequent loading of components is the component loader KL, which not only allows new components to be incorporated in the relevant system part, but it also allows the removal of components which are no longer required.

The capability to move components dynamically is of interest for vehicle systems, particularly bearing in mind the limited computation capacities on the vehicle side. Thus, on the one hand, it is desirable to need to reserve only a relatively small computation capacity in the vehicle and for the main load of the calculations to be borne in the system infrastructure external to the vehicle. On the other hand, the communications costs for is coupling the vehicle-side system part to the network should be kept as low as possible. However, the communications costs now differ considerably in some cases, depending on the state or region. Bearing in mind the mobility of vehicles, these boundary conditions may even change during a journey. If, furthermore, the absolute availability of a communications service is also included in the cost model, then this results in an optimization problem which can be solved considerably better with the capability to remove components dynamically between the system parts than with a rigid structure and the components being distributed.

The configuration manager KM is now used to "configure" a respective moved component into its new environment and to "inform" the already existing components about the component which is to be newly added to the relevant system part, that is to say to match its configuration to this. To this end, the configuration manager KM has access via the configuration interfaces to the individual components in the relevant system part. The configuration manager KM knows which components there are in the system, checks their consistency, and then makes the suitable modified configuration accesses to the individual components.

Figure 7:
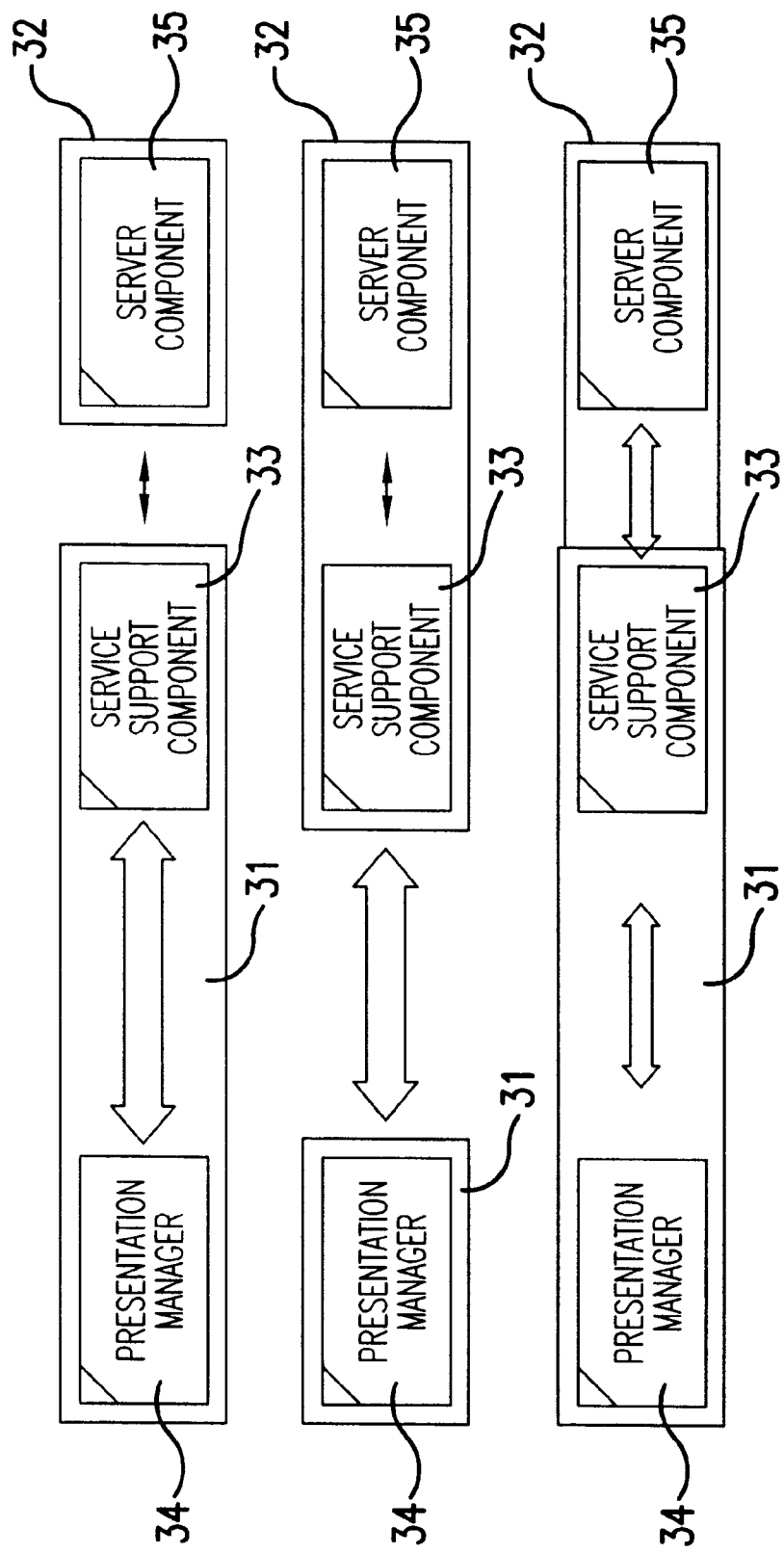
FIG. 7 shows a schematic block diagram which illustrates the dynamic movement of a component between system parts in FIG. 1.

FIG. 7 shows the capability for dynamic movement of a component between a vehicle 31, on the one hand, and a system infrastructure 32 external to the vehicle, on the other hand, using the example of a service support component 33 and based on three different scenarios which make such component movement desirable. In this context, see also the Journal article S. Hild and P. Robinson, "Mobilizing Applications", IEEE Personal Communications, 4, No. 5, 1997, page 26. This is based on an upgraded client/server model, in which the service support component 33 is also connected, as a server, between a presentation manager component 34 in the vehicle 31 as the client, and a server component 35 on the infrastructure side, and which, to a reduced extent, can carry out certain server functions instead of the server component 35 on the infrastructure side.

If the communications costs between the vehicle 31 and the infrastructure 32 are high, the solution illustrated in the top part of FIG. 7 is chosen, in which the service support component 33 is positioned in the vehicle 31, so that it can handle its communication with the presentation manager 34 within the vehicle, and a high proportion of the calculations are carried out in the vehicle 31, thus keeping the communication with the infrastructure 32 minimal, or avoiding it entirely at times. In this case, the vehicle forms a "thick mobile host" which contains a reduced version of the server component 35 on the infrastructure side, in the form of the service support component 33.

If the cost of communication between the vehicle 31 and the infrastructure 32 is, on the other hand, comparatively low, it is advantageous to choose the solution shown in the center part of FIG. 7, in which the service support component 33 is arranged in the infrastructure 32, where it can exploit the advantages of the greater computation capacity and the availability of further resources located in the data network, such as up-to-date traffic data. In this case, the vehicle forms a "thin mobile host".

The dynamic movement of components, such as the service support component 33 in this case, is now used to avoid a long-term restriction to one or the other of these two solutions and, instead, to be able to move the components backwards and forwards between the system parts, in this case between the infrastructure 32 and the vehicle 31, depending on the boundary conditions, throughout the system life; that is, to move the service support component 33 optionally into the vehicle 31 or into the infrastructure 32, as is shown in the lower part of FIG. 7. The vehicle 31 then forms a "component-based host" into which it is possible selectively to load components from the infrastructure 32, and from which components can be moved into the infrastructure 32.

Figure 8A:
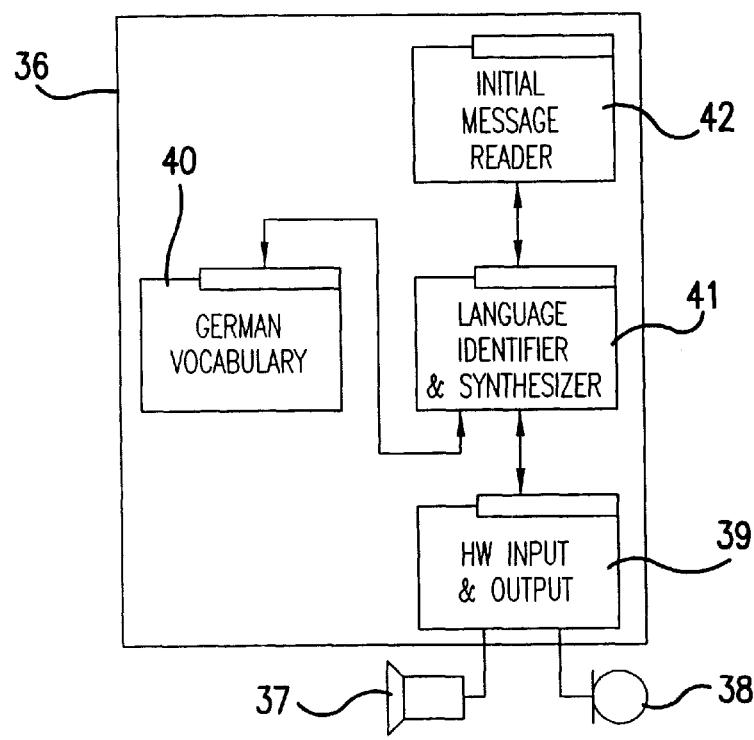
FIGS. 8a and 8b show schematic block diagrams which illustrate component movement, using the example of a voice control application.
Figure 8B:
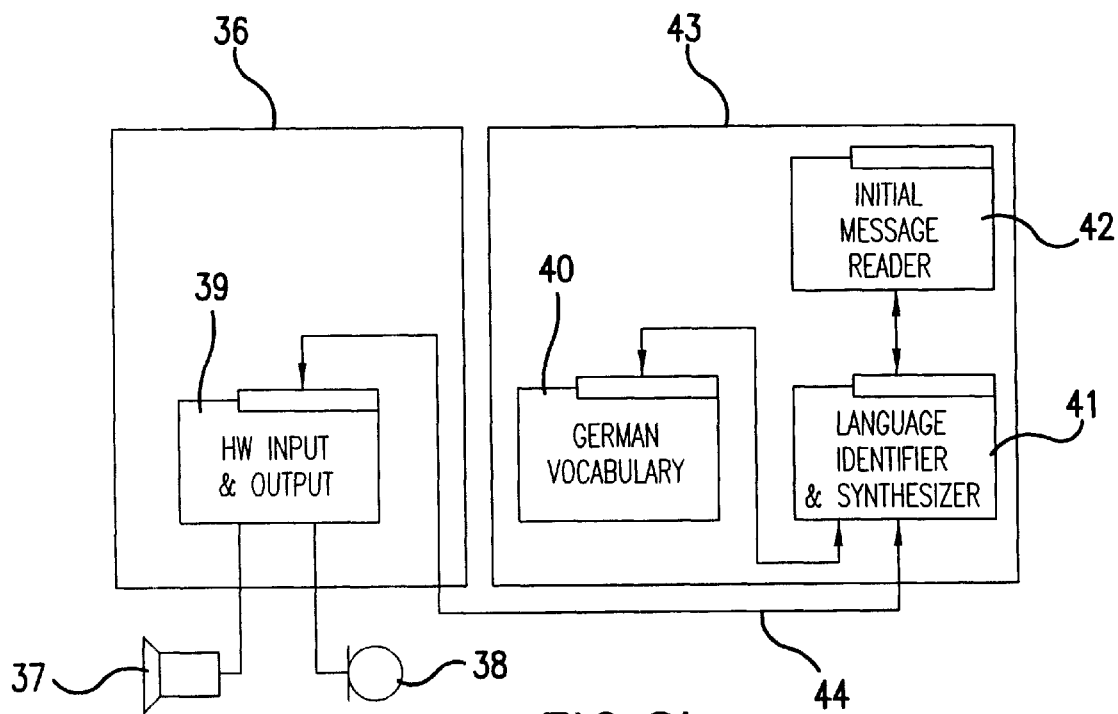

This essential characteristic of the present system will be illustrated more specifically using the example of a voice control application in FIGS. 8a and 8b. FIG. 8a shows a voice control system controller 36, which is equipped with a component system, that is to say with a component loader. The necessary hardware, that is to say a loudspeaker 37 and a microphone 38, are accessed via the controller 36. The following components run in this system part. A hardware-related component 39 is used to access the microphone 38 and the loudspeaker 37. A first application-supporting component 40 contains the vocabulary required for the desired voice control, for example in German. A second application-supporting component 41 forms a speech recognizer and synthesizer, which carries out the necessary speech recognition and speech synthesis. An application component in the form of an initial message reader 42 is used to control the application.

Based on this voice control system part, one possible scenario consists of the vocabulary component 40 being replaced by one using a different language in order to match the system, and thus the vehicle, to different countries. A different scenario may occur in the case of a rented vehicle in which the matching to the respective language desired by a customer is implemented by allowing the customer to use a menu to select the vocabulary component with the respective language, after which the relevant component is then loaded. Once the rented vehicle has been returned, the subsequently loaded component is then removed again.

A more complex situation relating to component movement for the system part in FIG. 8a is shown in FIG. 8b. This situation relates to as many components of the voice control system part as possible being moved out of the vehicle 36 into system parts external to the vehicle; that is, into the overall system infrastructure 43 that is external to the vehicle. Specifically, the present system's capability for dynamic component movement allows the application component 42 and the two application-supporting components 40, 41 to be moved into the infrastructure 43, where they can operate more efficiently owing to the greater computer power. The interface component 40, which is close to the vehicle equipment, remains in the vehicle 36. The data are transmitted via the interface component 40, which remains on the vehicle side, and a wireless connection 44 between the vehicle 36 and the infrastructure 43 external to the vehicle. Depending on the existing wireless communication, in particular its availability and its costs, it is in this way possible to choose an optimum compromise for the distribution of the components 39 to 42 of the voice control system between the vehicle 36 and the infrastructure 43 external to the vehicle.

Depending on the requirements for vehicle-related services, such as telematics services, the present distributed vehicle information processing and vehicle control system has a specific basic number of components in vehicles and in the infrastructure, which offer services such as "time", "location/position" or "map matching". These basic services may then be used by a number of other services. Thus, for example, the position information may be used not only by a navigation service but also by a breakdown service, in order to pass on the present vehicle position to the breakdown assistant. Service providers do not need to repeatedly remove such basic parts of the system, but can build on the existing basic components. Using the existing component-based system architecture, new services can be provided on the basis of existing components in two ways that are supported by the system architecture, to be precise using an interface-based service model, or an event-controlled service model.

In the interface-based model, it is assumed that the existing components and their service interfaces (which may in some circumstances be comprehensive) together with all the necessary methods are known. A new service can then easily be produced by use of the existing functions. This is dependent on the necessary knowledge being maintained relating to the fundamental existence of the component and its precise service scope.

Figure 9:
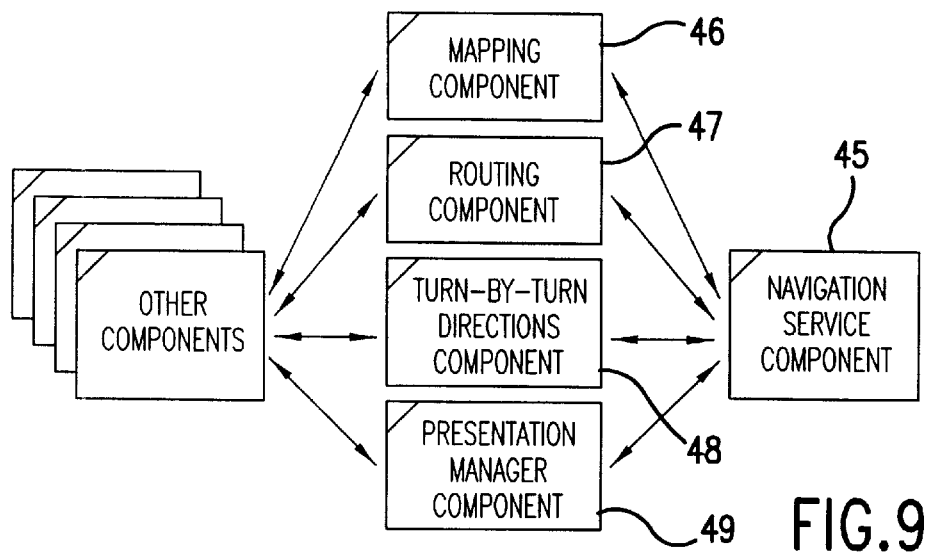
FIG. 9 shows a schematic block diagram of a navigation subsystem of the system shown in FIG. 1, based on a service interface.

FIG. 9 shows a navigation sub-system which is designed using such an interface-based model. In this case, a "navigation service" component 45 accesses the services of other components, such as a mapping component 46, a routing component 47, a wheel rotation-speed detection component 48, a presentation manager component 49 etc., in order to provide the user with their service. When the navigation service component 45 is being programmed, the interfaces of the components used must be known.

Figure 10:
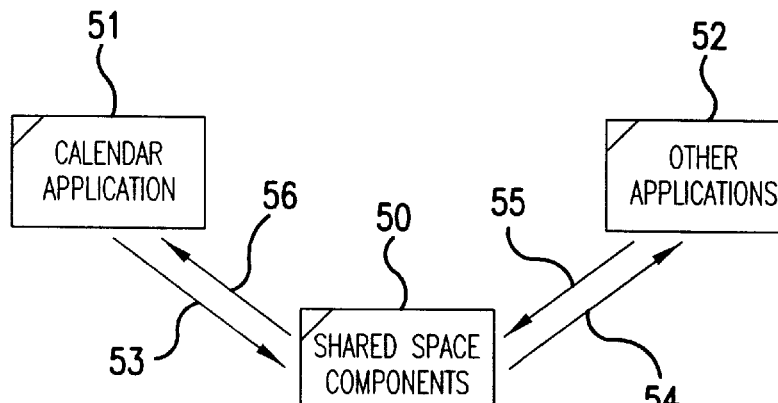
FIG. 10 is a schematic block diagram which shows a service interaction in the system shown in FIG. 1 via a data-maintenance component.

FIG. 10 shows the situation for an event-controlled model, which is provided by using a "shared-space" component 50 which represents a server-based data memory that is used jointly by a number of components that are involved, to which the components that are involved can write specific values/objects of interest, as is illustrated in FIG. 10 for a calendar application component 51 and a further application component 52. Furthermore, the components that are involved can be registered with this "shared-space" component 50, which thus acts as a data-maintenance component in order to be informed when a new value/object which is relevant for it occurs, referred to as a so-called "event-triggered notification".

Approaches of this type move the knowledge problem relating to the existence of components (mentioned above) to a higher level, since the communication between components always takes place via the "shared-space" component 50, which can be provided using a very small API and is known to each component. The components need agree only on the contents, which are written to the "shared-space" component 50. Such approaches are well known, for example by the terms "Linda Space", see Internet page "http://www.cs.yale.edu/HTML/YALE/CS/Linda/linda.html" and "Java Spaces", Sun Microsystems, Internet page http://java.sun.com/products/javaspaces/specs", in general computer processing.

In the example in FIG. 10, the calendar application 51 supplies new entries 53 to the data-maintenance component 50. If another application 52 is interested in such data, it obtains the relevant data information 54 from the data-maintenance component 50, provided it has registered with this component for that purpose. The other application 52 can generate new data 55 from this and make such data available to the other components, by writing the data to the data-maintenance component 50. If the calendar application 52 is interested in this new data 55, it can obtain the relevant information 56 from the data-maintenance component 50, after which the data replacement cycle can start once again from the beginning.

The advantage of this model is the mutually independent programming of the components and the small amount of "shared-space" API. Furthermore, new components can be integrated in the system without any problems, and immediately actively contribute to the provision of value-added services. To do this, applications must be written "cooperatively" that is to say such that they also actually write relevant information to the "shared-space" component. Suitable mechanisms, such as time monitoring, transaction models, etc., are implemented in the "shared-space" component and suppress the occurrence of oscillating effects between components when new values are alternately being written to the "shared-space" component.

A combined implementation of partially interface-based modeling and partially event-controlled modeling, depending on the respective applications, may be advantageous. Thus, for example, when processing an engine speed value, which is available all the time at intervals of a few milliseconds, an event-controlled model, in which each new speed value is written to the "shared-space" component and all potential recipient components are informed of this, makes little sense, so that interface-based modeling is to be preferred for this purpose.

A platform-independent implementation of the present distributed vehicle information processing and vehicle control system is feasible, as already explained, for example by choosing the development and implementation environment "Java", since this already directly supports an object-oriented implementation of components at many points, and in this case, as has likewise been mentioned above, the ChaiServer from Hewlett-Packard, implemented in Java may, for example, be used as the component loader. To allow access to the system hardware, which is not envisaged as standard by Java, additional classes are introduced to the system, which are likewise monitored via the system configuration management and are loaded into the vehicle only when required. The removal of a component, in order to release the relevant resource once again, is likewise supported by the ChaiServer in the scope of the dynamic component movement process.

The Java implementation results in a high level of platform independence. Components may be stored in a component database, in the infrastructure external to the vehicle, and may be loaded into the appropriate systems as required. The components are preferably modeled and implemented using object-based viewpoints, and are in this case similar to the Java "Servlets", which are used to increase the functionality of the server in a simple way, see for general computer processing, the publication "Servlets" from Sun Microsystems, Internet page "http://java.sun.com/products/javaserver/servlets". Communication between the components is based on Java-RMI.

Methods for components which run in the context of the ChaiServer are called up by means of HTTP. See J. Morgan, "The HEHAW Invocation Model," Broadband Information Systems, Hewlett-Packard, Palo Alto, 1997. The use of HTTP has the advantage that it is virtually universally supported and "firewalls" can also be transferred. The desired position transparency is achieved by the addressing and call syntax mentioned above using a "uniform resource locator" (URL).

Figure 11:
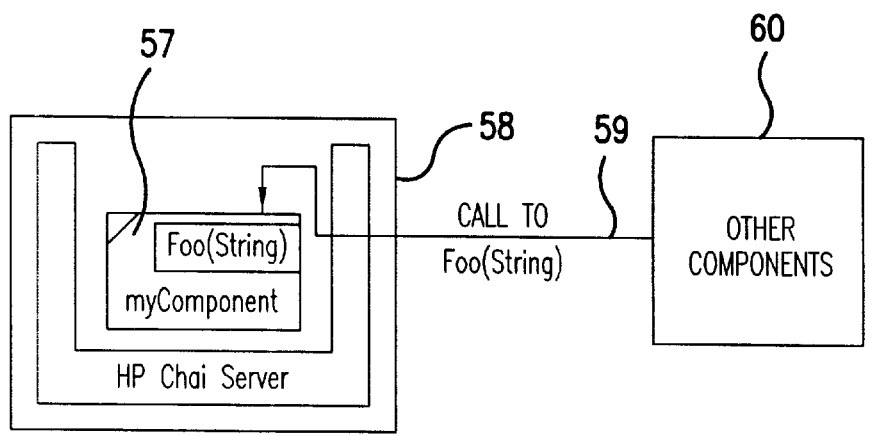
FIG. 11 shows a schematic block diagram to illustrate the calling of a component method.

FIG. 11 shows an application relating to this with an example of a component 57, which is implemented on a vehicle machine 58. The component 57 provides a "Foo" method, which is called up using a string argument. The result of the method may be an HTML document. The HTTP call syntax for a call 59 by another component 60 then contains the address of the vehicle machine 58, the designation of the example of a component 57, and the details of the "Foo" method with "html" characterization.

The above description of an advantageous exemplary embodiment and possible modifications to it makes it clear that the distributed vehicle information processing and vehicle control system according to the invention provides a flexible and dynamically adaptable environment for vehicle-related service applications. The object-based modeling and capability to combine the components easily by means of their standard interfaces allow new services to be set up quickly and easily. The capability to move components between the vehicle and the infrastructure external to the vehicle throughout the system life allows the system to be optimally matched to the dynamically changing boundary conditions in the infrastructure.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A distributed vehicle information processing and vehicle control system comprising:
   a first system part situated on board the vehicle and having hardware and software to perform at least a first vehicle-related information processing function;
   at least one second system part situated at a location physically separate from said first system part, and having hardware and software to perform at least a second vehicle-related information processing function; and
   a data transmission network via which said first system part and said at least one second system part communicate with one another, wherein:
   each of the first system part and the at least one second system part includes different software components which perform differing functionality, and which communicate and cooperate with one another to carry out different vehicle related applications using shared functionality of said components;
   each of said components has a function-calling interface, via which a function carried out by the component is accessible by other components in the same system part or in another system part, and a configuration interface, via which a configuration of the component is definable and variable;
   a configuration manager component is provided for configuring each component via its respective configuration interface, depending on what other components are present in the system, and depending on a location or relocation of components as between said first system part and said at least one second system part; and
   said system includes means for addition of components to or removal of components from, or movement of one or more components dynamically between, said first system part and said at least one second system part.

2. The distributed system according to claim 1, further comprising a component loader which is associated with the components of a respective system part.

3. The distributed system according to claim 1, wherein the components in a respective system part are grouped hierarchically on a function-specific basis in an application component layer, an interface component layer, and an intermediate aggregation component layer.

4. The distributed system according to claim 1, wherein respective application components communicate one of directly, using an interface-based model, and via a data-maintenance component, using an event-controlled model.

* * * * *